F. J. SOTH.
TAG HOLDER.
APPLICATION FILED JUNE 21, 1911.
1,017,603.
Patented Feb. 13, 1912.
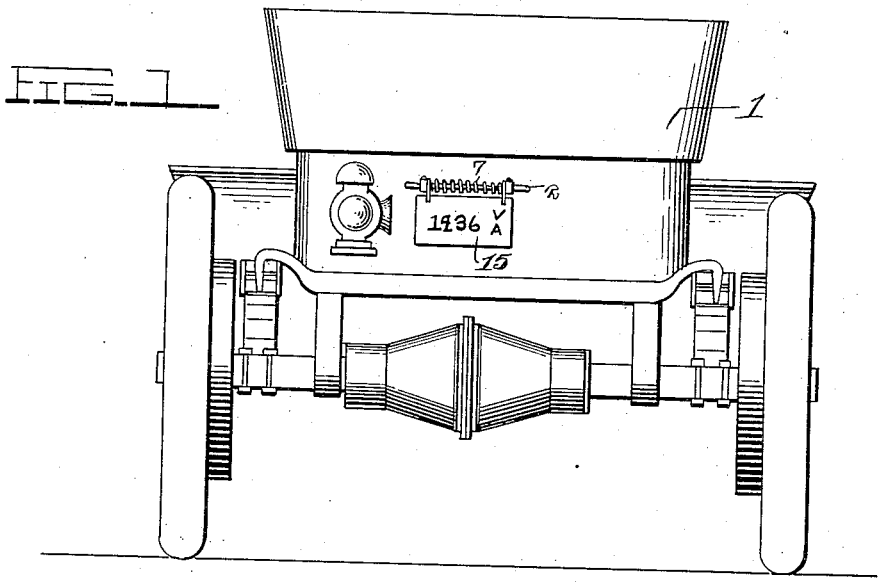
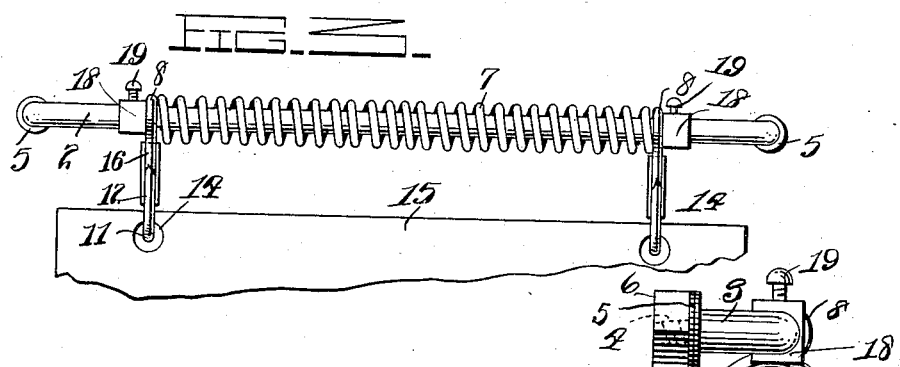
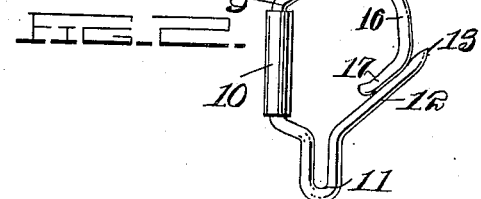
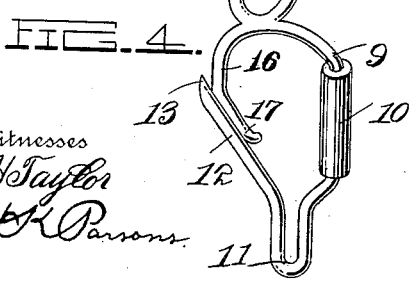
Witnesses
J H Taylor
H L Parsons
Inventor
Frank J Soth.
By Harry Ellis Chandlee
Attorney

UNITED STATES PATENT OFFICE.

FRANK J. SOTH, OF SEDGWICK, KANSAS.

TAG-HOLDER.

1,017,603.  Specification of Letters Patent. Patented Feb. 13, 1912.

Application filed June 21, 1911. Serial No. 634,554.

*To all whom it may concern:*

Be it known that I, FRANK J. SOTH, a citizen of the United States, residing at Sedgwick, in the county of Harvey and State of Kansas, have invented certain new and useful Improvements in Tag-Holders, of which the following is a specification.

My invention relates to improvements in tag holders, and has for its leading object the provision of an improved form of tag holder particularly adapted for use in securing license tags on the rear of automobiles.

The further object of my invention is the provision of an automobile tag holder particularly adapted for the use of those who frequently indulge in cross country runs, in that my tag holder while securely fastening the license tag in correct position at the rear of the automobile and satisfactorily holding the said tag in place will permit of the quick and ready detachment of the tag to substitute the tag of a different State.

Another object of my invention is the provision of an improved license tag holder for automobiles which will serve to engage and securely retain in position tags of various shapes and sizes and which may be readily adjusted to firmly engage the said different tags to prevent undue movement thereof with respect to the automobile so that the license number will at all times be clearly displayed in accordance with the usual laws and regulations of the State.

Other objects and advantages of my improved automobile license tag holder will be readily apparent by reference to the following description taken in connection with the accompanying drawings, and it will be understood that I may make any modifications in the specific structure shown and described within the scope of my claims without departing from or exceeding the spirit of the invention.

Figure 1 represents a rear view of an automobile having my tag holder applied in position thereon and serving to retain a license tag. Fig. 2 represents an enlarged side elevation of my device in use. Fig. 3 represents a detailed view of my device, and Fig. 4 represents a perspective view of one of the tag engaging clips.

In the drawings, the numeral 1 designates the automobile to which my improved device is applied, said device comprising a bracket adapted to be secured to the automobile and spring pressed clips carried by the said bracket for engagement in the usual slots or apertures formed in the metallic license tag to facilitate the securing of the said tag in position.

The supporting bracket of my device comprises a bar 2 having its ends 3 bent at right angles to the bar and formed with reduced threaded tangs 4 adapted to pass through the frame or body of the automobile, the usual protecting washers 5 being mounted on the said tangs 4 and nuts 6 being engaged on the tangs and turned to bear against the washers to securely fasten the said bracket bar 2 in position upon the automobile. Wound upon the central portion of the said bar 2 is the helical spring 7 which is preferably formed from resilient brass wire, while slidably engaged upon the bar 2 at each end of the said spring and having the end of the spring bearing thereagainst is one of my license tag engaging clips. Said clips comprise an eye portion 8 which fits onto the bar 2, while depending from the rear of each of the eyes is the arm 9 having the rubber tubing 10 engaged thereon to provide a buffer and prevent the said arm from scratching the finish of the said automobile body. Said arm 9 terminates at its lower end in a reduced or narrow loop 11 while extending upward from the said loop 11 is the resilient end 12 slightly flattened on its upper face and terminating in a point 13 to facilitate the passing of the said portion 12 through the aperture or slot 14 formed in the license tag 15.

Extending forwardly and downwardly from the eye 8 is the arm 16 having an inwardly curved portion 17 somewhat flattened on its under face and adapted to rest against the upper portion of the resilient finger 12 to coact with the said member 12 and prevent accidental losing or slipping off of the license tag 15 which is engaged in the retaining loop 11 of my clip.

It will be seen that the ends of the spring 7 bear against the eye portion 8 of my improved clip and tend to force the said clip outward toward the ends of the bar 2, and to engage the clip in the apertures 14 of the license tag it is necessary to press the clips toward each other against the expansive force of the spring. When the tag has been engaged on the said clip however, it is undesirable to allow the spring and clips to slide back and forth along the bar or rod 2 as would be the case were not some abutment provided for limiting the movement of the clips bearing the tag. To limit the movement of the clips and thus to hold the tag stationary in desired position, I mount upon the bar 2 exterior to each of the clips the sleeve or collar 18 having engaged therein the set or clamp screw 19 and after the license tag is placed in position I slide the two collars inward until they bear against the outer face of the eyes 8 and I then manually tighten the set screw 19 to lock the collars in adjusted position and thus to prevent the sliding of the clip and spring longitudinally of the bar 2.

From the foregoing description taken in connection with the accompanying drawings, the construction and use of my improved license tag support for use upon automobiles or other vehicles will be readily understood and it will be seen that I have provided a simple and efficient device of this character which may be readily secured upon an ordinary vehicle and which will serve to satisfactorily engage and support various types of license tags, and while securely holding said tags in position, will permit of their ready detachment when it is desired to change the tag either on account of passing into a different State or jurisdiction, or when it is required to have a different tag for the ensuing year.

I claim:

1. A license tag holder, comprising a U-shaped bar having its ends adapted to be secured to a vehicle, a spring wound on the central portion of the bar, clip members having eye portions slidably engaged on the bar and having the ends of the spring resting thereagainst to force the same outward, said clips having resilient portions adapted to engage a tag, and adjustable abutments for limiting the outward movement of the clips.

2. A tag holder, comprising a supporting bar, clips slidably engaged on the bar for engaging the tag, resilient means for forcing the clips apart and stops for limiting the motion of the clips.

3. A tag holder, comprising a supporting bar, a spring coiled upon the bar, clips slidably mounted upon the bar and having depending portions adapted to engage the tag, and means adjustably mounted on the bar exterior to the clips and adapted to engage the clips to hold the same inward against the expansive force of the spring.

4. A tag holder, comprising a supporting bar, a pair of clips having eye portions slidably engaged upon the bar, a spring wound on the bar and having its end bearing against the eye portions for forcing the clips apart, said clips having resilient portions for permitting of the introduction of the tag thereinto and having depending reduced loops for engaging and holding the tag, and means for locking the clips against sliding movement along the bar.

In testimony whereof I affix my signature, in the presence of two witnesses.

FRANK J. SOTH.

Witnesses:
A. L. GERMAN,
HARRY W. MOREY.

---

Copies of this patent may be obtained for five cents each, by addressing the "Commissioner of Patents, Washington, D. C."